(12) United States Patent
Bell et al.

(10) Patent No.: US 7,952,075 B2
(45) Date of Patent: May 31, 2011

(54) NEUTRON ABSORPTION DETECTOR

(75) Inventors: Zane William Bell, Oak Ridge, TN (US); Lynn Allen Boatner, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 160 days.

(21) Appl. No.: 12/228,661

(22) Filed: Aug. 14, 2008

(65) Prior Publication Data
US 2010/0038551 A1    Feb. 18, 2010

(51) Int. Cl.
G01F 23/00    (2006.01)

(52) U.S. Cl. .................................................. 250/361 R

(58) Field of Classification Search ............... 250/361 R
See application file for complete search history.

(56) References Cited

U.S. PATENT DOCUMENTS

| | | | |
|---|---|---|---|
| 2,738,430 A | 3/1956 | Schulman et al. | |
| 2,799,780 A | 7/1957 | Ruderman | |
| 2,954,473 A | 9/1960 | Hoover et al. | |
| 3,089,957 A | 5/1963 | Bishay | |
| 3,560,741 A | 2/1971 | Strindehag | |
| 3,885,159 A * | 5/1975 | Jahn et al. .................. | 250/472.1 |
| 3,984,332 A | 10/1976 | Nelson et al. | |
| 4,251,726 A | 2/1981 | Alvarez | |
| 4,292,527 A * | 9/1981 | Franks et al. ............. | 250/483.1 |
| 4,297,584 A | 10/1981 | Buchanan et al. | |
| 4,566,987 A | 1/1986 | Gliemeroth et al. | |
| 4,608,352 A | 8/1986 | Laurent et al. | |
| 4,699,889 A | 10/1987 | Sales et al. | |
| 4,847,008 A | 7/1989 | Boatner et al. | |
| 4,847,219 A | 7/1989 | Boatner et al. | |
| 5,166,073 A * | 11/1992 | Lefkowitz et al. .............. | 436/57 |
| 5,298,329 A | 3/1994 | Boatner et al. | |
| 5,812,729 A | 9/1998 | Allison et al. | |
| 6,011,266 A | 1/2000 | Bell | |
| 7,271,389 B2 * | 9/2007 | August et al. ............ | 250/370.05 |
| 2008/0135772 A1 | 6/2008 | Claus et al. | |

FOREIGN PATENT DOCUMENTS

JP    2001-42048 A    2/2001

OTHER PUBLICATIONS

C.-K. Loong, "Neutron scattering studies of industry-relevant materials: connecting microscopic behavior to applied properties," 1999, Journal of Physics and Chemistry of Solids, vol. 60. pp. 1397-1401.*

Suzuya et al., "The structure of lead-indium phosphate glass," 1994. downladed from http://www.osti.gov/bridge/servlets/purl/10120477-Ix4p9g/webviewable/10120477.pdf.*

(Continued)

*Primary Examiner* — David P Porta
*Assistant Examiner* — Kiho Kim
(74) *Attorney, Agent, or Firm* — Brinks Hofer Gilson & Lione

(57) ABSTRACT

A method of detecting an activator, the method including impinging a receptor material that is not predominately water and lacks a photoluminescent material with an activator and generating Cherenkov effect light due to the activator impinging the receptor material. The method further including identifying a characteristic of the activator based on the light.

41 Claims, 4 Drawing Sheets

OTHER PUBLICATIONS

Loong et al., "Structure and Dynamics of Phosphate Glasses: from Ultra- to Orthophosphate Composition," 1997, downloaded from www.osti.gov/bridge/servlets/purl/555277-rKWtGu/webviewable/555277.pdf.*

Fujieda et al., "Electron transmission and avalanche gain in narrow lead glass tubing," 1985, IEEE Transactions on Nuclear Science, vol. NS-32, No. 1, pp. 687-691.*

U.S. Appl. No. 12/228,659, filed Aug. 14, 2008, Bell et al.

U.S. Appl. No. 12/228,660, filed Aug. 14, 2008, Bell et al.

Kaye, Stephen V., "Use of Miniature Glass Rod Dosimeters in Radiation Ecology," Ecology, vol. 46, No. ½, Jan. 1965, pp. 201-206.

Johnson, F.A., "Investigation of Source-Dependent Contributions to Photomultiplier Noise," Nuc. Instr. And Methods, vol. 87, 1970, pp. 215-220.

Waggener, Robert G. et al., "Low Dose Ferrous Sulfate Dosimetry by Direct Photon Counting," Radiation Research, vol. 45, 1971, pp. 244-251.

Sowerby, B.D., "Čerenkov Detectors for Low-Energy Gamma Rays," Nuc. Instr. And Methods, vol. 97, 1971, pp. 145-149.

Sales, B.C. et al., "Lead-Iron Phosphate Glass: A Stable Storage Medium for High-Level Nuclear Waste," Science, vol. 226, No. 4670, Oct. 5, 1984, pp. 45-48.

Sales, Brian C. et al., "Optical, Structural, and Chemical Characteristics of Lead-Indium Phosphate and Lead-Scandium Phosphate Glasses," Journal of the American Ceramic Society, vol. 70, No. 9, Sep. 1987, pp. 615-621.

Krupke, W.F. et al., "Promethium-doped Phosphate Glass Laser at 933 and 1098 nm," Appl. Phys. Lett., vol. 51, No. 26, Dec. 28, 1987, pp. 2186-2188.

Knoll, Glenn, "Radiation Detection and Measurement," $3^{rd}$ Ed., John Wiley and Sons, NY, 2000, p. 282.

Kazkaz, Kareem et al., Abstracts regarding "Reducing Neutron Backgrounds in Dark Matter Detectors with Doped Water Shields," believed to have been published by APS, 2007, three pages.

Coleman, W. et al., Abstract regarding "transparency of 0.2% GdCl3 Doped Water in a Stainless Steel Test Environment," believed to have been published by Harvard University, May 2008, two pages.

Dazeley, Steven, Presentation at Sorma West Conference at Berkeley regarding "Detection of Special Nuclear Material with a Water Cerenkov based Detector," believed to have been presented in Jun. 2008, pp. 1-12.

Baltrusaitis, R.M., et al., "Position Determination of High Energy Photons in Lead Glass," IEEE Transactions on Nuclear Science, vol. NS-27, No. 1, Feb. 1980, pp. 68-73.

Morian, Hans F., "New Glasses for Optics and Optoelectronics," SPIE Optical Fabrication and Testing, vol. 1400, 1990, pp. 146-157.

Bell, Z.W., et al., "Neutron Detection via the Cherenkov Effect," IEEE Nuclear Science Symposium Conference Record, N49-3, 2007, pp. 2296-2300.

* cited by examiner

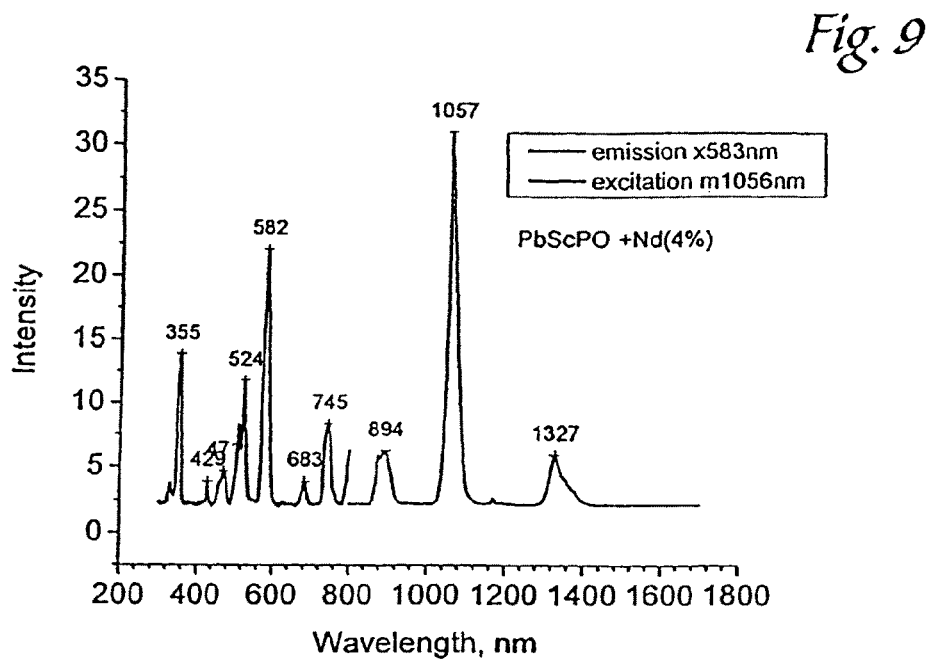
Fig. 9
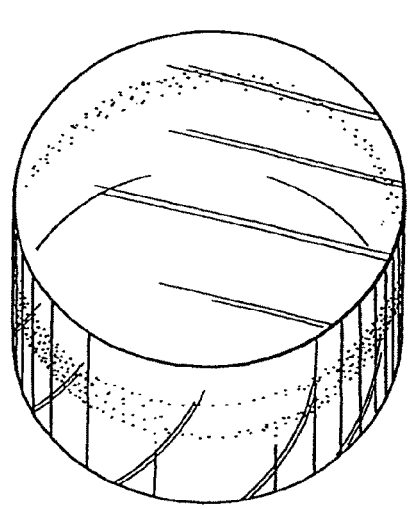
Fig. 3
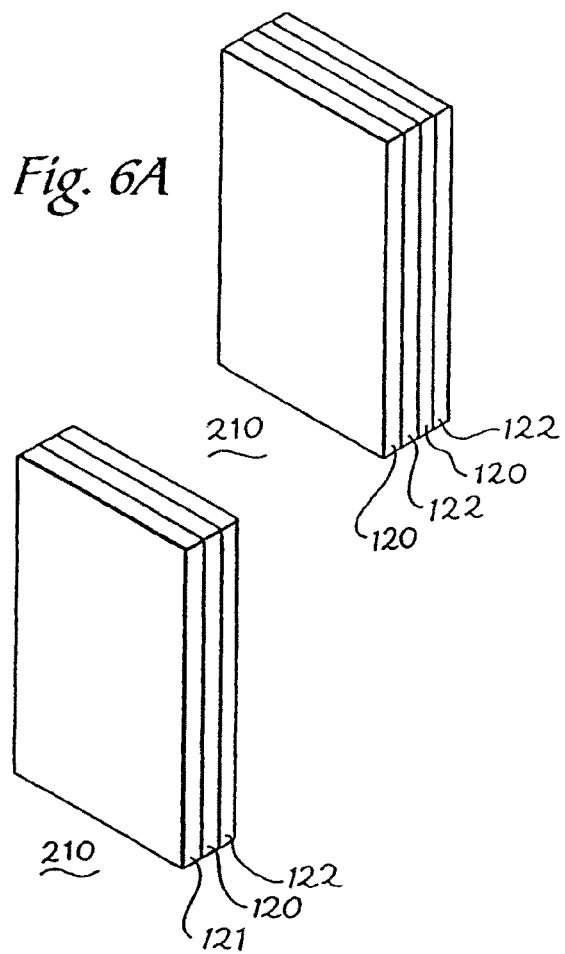
Fig. 6A
Fig. 6B

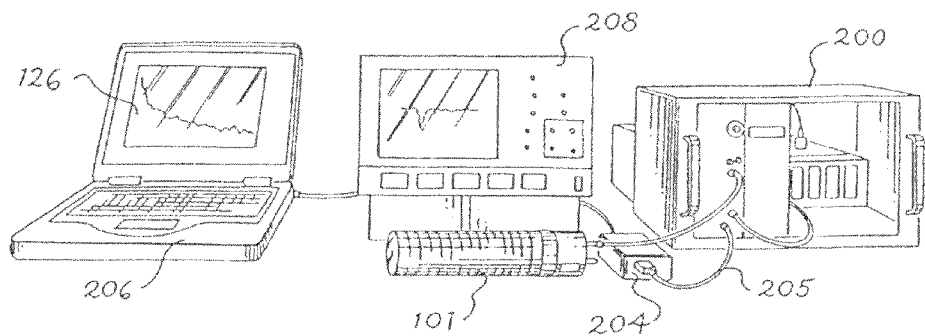
Fig. 8
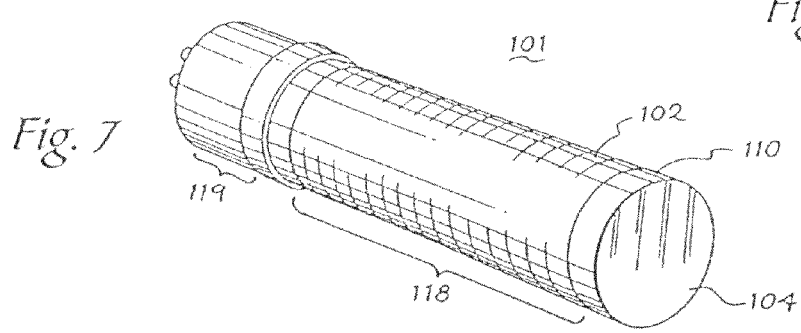
Fig. 7
Fig. 4
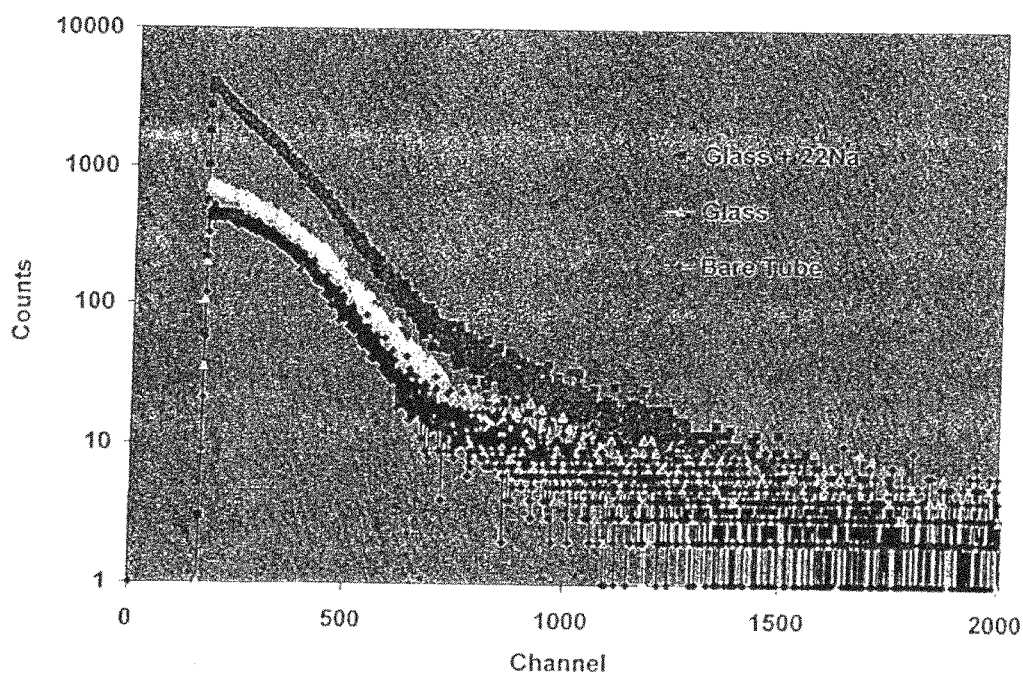

NEUTRON ABSORPTION DETECTOR

This invention was made with government support under Contract No. DE-AC05-00OR22725 awarded by the U.S. Department of Energy. The government has certain rights in the invention.

BACKGROUND

1. Field of the Invention

The present invention relates to a neutron absorption detector, such as a neutron absorption detector that detects neutrons by use of the Cherenkov effect.

2. Discussion of Related Art

The detection of thermal neutron neutrons is well known. For example, thermal neutron detection is usually accomplished with 3He tubes that are routinely incorporated into commercial instruments. 3He tubes typically are filled with gas at pressures in excess of two atmospheres. Transportation of these tubes by air requires a waiver issued by the Department of Transportation; without this waiver, the tubes must be delivered by ground transportation. A tube's structure comprises a cylinder filled with gas in which a thin wire is strung axially under tension. This wire structure is susceptible to vibration and this causes false counts. Detectors based on 3He tubes, with suitable moderator around them, can be made to approach 100% intrinsic efficiency.

Glass scintillators for thermal neutron detection are commercially available. Saint-Gobain markets Li-loaded silicate glass made from a recipe approximately 40 years old. In addition, PNNL (Pacific Northwest National Laboratory) has produced Li-loaded glass fibers for neutron detection, and has licensed the process to Nucsafe, LLC. Nucsafe manufactures the fiber and uses it in both portable and fixed neutron detectors. A basic difficulty associated with Li-loaded glass scintillators is that the neutron response is not well distinguishable from the gamma response when there is a high gamma flux.

The production of light by the glass envelopes of photomultipliers is well known. It is believed that such light is caused by scintillation processes in the glass and Cherenkov light. Such light has been deemed as noise and so steps have been taken in the past to reduce the effect of such light in low-noise photomultipliers. It should be noted that Cherenkov light is emitted when a charged particle, such as an electron or a positron, moves faster than the speed of light in a medium. Gamma and x rays of sufficient energy can produce Cherenkov light indirectly by liberating electrons from atoms in the medium (Compton scattering and photoelectric effect) and by generating positrons (pair production). For example, Cherenkov light is the source of the blue glow surrounding the core of swimming pool reactors and spent fuel in storage ponds. The condition for the production of Cherenkov light is given by $$\beta n > 1, \quad \text{Eq. (1)}$$

wherein n is the index of refraction of the medium in which the particle is traveling and $\beta$ is equal to the ratio v/c, wherein v is the speed of the particle and c is the speed of light in vacuum.

There are instances where the detection of Cherenkov light is desirable in high-energy physics applications. Such detectors are routinely used for muons and very high-energy (>1 GeV) particles. Such detectors include RICH (ring imaging Cherenkov) detectors which are made with glass gels of various index of refraction butted together and ordered according to index of refraction so that the Cherenkov cone developed in each section of gel is superimposed on all the others to form a ring of light that is indicative of the energy of the particle passing through the assembly.

There also exist water Cherenkov detectors, such as those at the Sudbury Neutrino Observatory (SNO) and the Kamioka Observatory (Super-Kamiokande) that are used for the detection of Cherenkov light caused by the interactions of neutrinos with electrons or nucleons. These interactions result in high-energy electrons that produce Cherenkov light.

In another water Cherenkov detector, the water includes a neutron absorbing material. When neutrons pass through the water, they are captured by the neutron absorbing material resulting in the emission of prompt gamma rays. Such gamma rays then energize electrons to such an extent that the electrons produce Cherenkov light within the water.

For portal monitoring, both non-spectroscopic plastic scintillator and spectroscopic NaI detectors are commercially available. Cherenkov detectors will not replace NaI or any other spectroscopic device; however, several embodiments of the present invention may provide a more effective detector for gamma rays above 300 keV, while being insensitive to most medical isotopes. Notably omitted from the "insensitive" list are positron emitters producing 511 keV annihilation gamma rays. Consequently, radiation from patients recently examined by Positron Emission Tomography (PET) could be expected to be detectable by Cherenkov light.

OBJECTS AND SUMMARY OF THE INVENTION

One aspect of the present invention regards a detector that includes a receptor material that is not predominately water and lacks a photoluminescent material, wherein upon being impinged by an activator the receptor causes light via the Cherenkov effect to be generated. The detector further includes a light detector that receives the light and identifies a signal characteristic of the activator.

A second aspect of the present invention regards a portal monitor that includes a frame defining a path and a detector incorporated into the frame. The detector including a receptor material that is not predominately water and lacks a photoluminescent material, wherein upon being impinged by an activator the receptor causes light via the Cherenkov effect to be generated. The detector further including a light detector that receives the light and identifies a signal characteristic of the activator.

A third aspect of the present invention regards a method of detecting an activator, the method including impinging a receptor material that is not predominately water and lacks a photoluminescent material with an activator and generating Cherenkov effect light due to the activator impinging the receptor material, the method further including identifying a characteristic of the activator based on the light.

A possible advantage of one or more aspects of the present invention lies in the use of a solid or liquid material for detection of neutrons instead of a high pressure gas such as used in 3He tubes.

Another possible advantage of one or more aspects of the present invention is the ability to detect neutrons without the need for a large optical readout system.

Further characteristics and advantages of the present invention will become apparent in the course of the following description of an exemplary embodiment by the drawings.

BRIEF DESCRIPTION OF THE DRAWINGS

FIG. 3 shows an embodiment of lead indium phosphate glass neutron activation material in accordance with the present invention that is to be used with the neutron activation detector of FIG. 1;

FIG. 4 shows a measured gamma response for the neutron activation material of FIG. 3;

FIG. 6A shows a first embodiment of a multi-layer neutron activation material to be used with the neutron activation detector of FIG. 1;

FIG. 6B shows a second embodiment of a multi-layer neutron activation material to be used with the neutron activation detector of FIG. 1;

FIG. 7 shows an embodiment of a detector to be used with the system of FIG. 1;

FIG. 8 shows another embodiment of a neutron activation detector system in accordance with the present invention;

FIG. 9 is an example of absorption and emission spectra for an embodiment of a lead scandium phosphate neutron activation material that contains Nd in accordance with the present invention that is to be used with the neutron activation detector of FIG. 1.

DETAILED DESCRIPTION OF THE PREFERRED EMBODIMENTS

Figure 1:
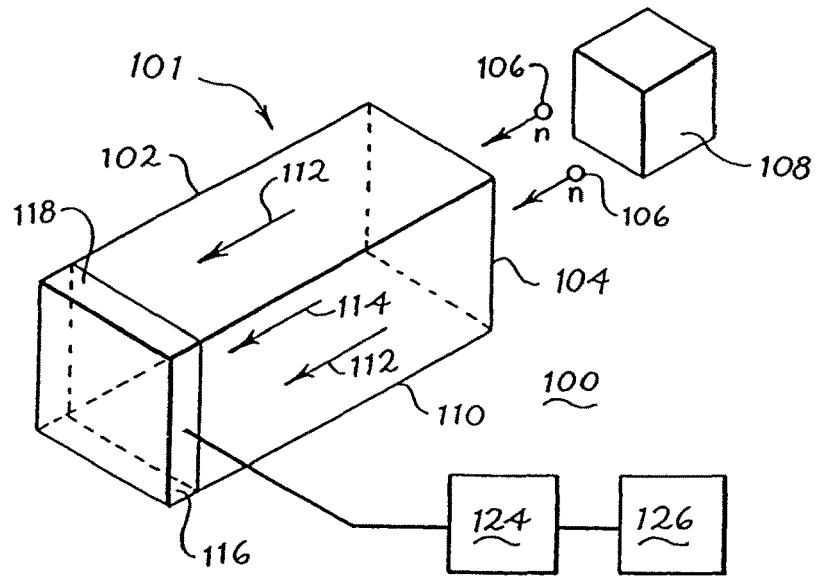
FIG. 1 schematically shows an embodiment of a neutron activation detector system in accordance with the present invention.

As schematically shown in FIG. 1, an activation detector system, such as neutron activation detector system 100, includes an activation detector, such as neutron activation detector 101, that includes a housing 102 that has an input section 104 for receiving activators, such as neutrons 106, from an activator source, such as neutron source 108. Examples of a neutron source 108 are thermal neutron sources (moderated AmLi or PuBe) and fast neutron sources (deuterium-tritium accelerator, un-moderated PuBe or AmBe). Thermal neutrons have an average energy of 0.0253 eV, while fast neutrons generally have energies that range from a few keV to greater than 1 MeV. Other examples of activators are charged particles, such as electrons or positrons, and ionizing electromagnetic radiation, such as gamma rays emitted by a nucleus or x rays emitted by atoms whose electrons are changing orbitals.

The input section 104 includes a receptor material, such as neutron sensitive material 110, which has neutrons 106 impinging thereon. As explained later, the neutrons 106 cause the neutron sensitive material 110 to generate Cherenkov light 112. Intrinsic scintillation light 114 may also be produced. Such light 112, 114 is then directed to an output section 116 of the housing 102. The output section 116 includes a photosensitive or light detector 118, such as a photomultiplier or a photodiode, which directly abuts an output end of the material 110. The choice of the photosensitive detector 118 will depend on the wavelengths of the light 112, 114 emitted by the neutron sensitive material 110. Since Cherenkov light is produced with a continuum of wavelengths, but heavily weighted toward the blue and ultraviolet portions of the spectrum, a photomultiplier would be preferred. If a photomultiplier is used, it is envisioned that 1 Watt of power will be needed to drive the photosensitive detector 188 and 200 mW if a photodiode is used. Such power can be realized from wall current and with a battery-backup for operation during loss of grid power.

The photosensitive detector 118 can be powered from AC mains while such power is available, but switching to batteries if/when external power is lost. Most of the time, the neutron activation detector 100 can remain in a low-power state and can periodically broadcast "statement-of-health" messages. A separate detector located in the output section 116 can detect a neutron-activated event and bring the detector 100 to life to begin broadcasting count-rate data.

With the above description in mind, operation of the neutron activation detector 100 can be understood. In particular, the input section 104 of the detector 100 is positioned so that a neutron source 108 can be detected by the detector 100. Neutrons 106 can then be received by the neutron-sensitive material 110. The neutron-sensitive material 110 is designed so that Cherenkov light is generated.

Without being held to any particular theory, Cherenkov light is generated in neutron-sensitive material 110 by having the neutrons 106 interact with a neutron sensitive isotope dispersed in the matrix of the material 110. A radioactive decay occurs wherein radioactive by-products, such as particles and gamma rays, are generated.

Figure 2:
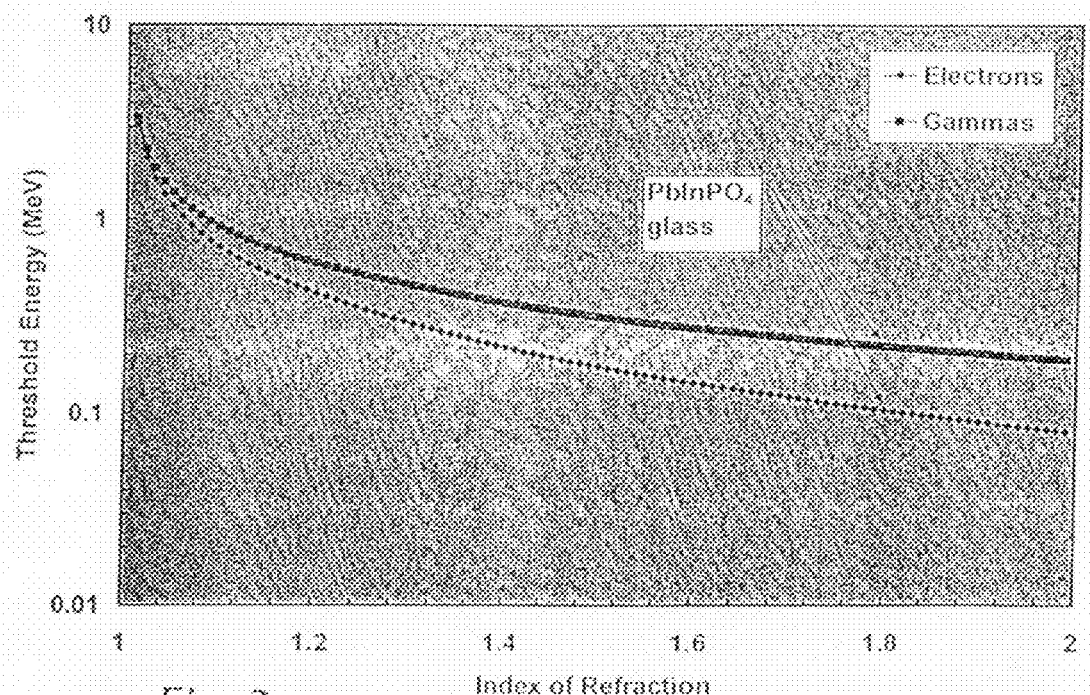
FIG. 2 shows the threshold for production of Cherenkov light by gamma rays and electrons for the neutron activation material of lead indium phosphate glass, wherein the gamma ray source reflects only Compton electrons.

In the case of a radioactive by-product, the threshold kinetic energy, Tth, above which the particle can generate Cherenkov light. Defining the kinetic energy, T, to be the difference between the relativistic total energy and the rest mass m0, the threshold is found to be $$T_{th} = m_0 \left( \frac{n}{\sqrt{n^2 - 1}} - 1 \right),  \quad \text{Eq. (2)}$$

wherein n is the index of refraction of the medium and m0 is the rest mass of the particle. For the case of a radioactive interaction, the energies of the by-product particle are such that only electrons and positrons have a sufficiently low rest mass to produce Cherenkov light, assuming physically realizable materials with indices of refraction less than approximately 2.5 per Eq. 2. A source for background energetic electrons that can produce Cherenkov light, are photons and gamma rays from naturally occurring radioactive materials, such as 40K and 232Th, that liberate such electrons via the photoelectric effect and Compton scattering (pair production is not a significant contributor until the photon energy is above 5 MeV). The threshold energy, Eth, for such photons to liberate such background energetic electrons is always higher than the threshold, Tth, for electrons liberated from a radioactive reaction. For Compton scattering, the threshold energy for gamma rays is $$E_{th} = \frac{1}{2} m_0 \left( \frac{n}{\sqrt{n^2 - 1}} - 1 \right) \left( 1 + \sqrt{1 + \frac{2}{\left( \frac{n}{\sqrt{n^2 - 1}} - 1 \right)}} \right), \quad \text{Eq. (3)}$$

where the symbols have been defined above. The threshold energy for gamma rays to generate background energetic electrons is higher than that for electrons as shown in FIG. 2. Consequently, the present invention discriminates against low-energy x rays and gamma rays having energies lower than Tth.

As an example, for materials with index of refraction near that of water (n≈1.33), the threshold energy for electrons is approximately 264 keV, for plastics and many silicate glasses (n≈1.5), the threshold energy for electrons is approximately 175 keV and that for photons is 315 keV. For lead indium phosphate glass (n≈1.8), the threshold for electrons is 104 keV and the threshold for photons is 223 keV. Thus, it is seen that neutron activation detector 100 has a bias against low-energy gamma or x radiation since it is based on detecting Cherenkov light.

In view of the desired properties of the matrix and isotope of the neutron sensitive material 110, there are a number of combinations of matrices and isotopes that can be employed in neutron activation detector 100. For example, the selection of neutron-sensitive material will be determined by the chemistry of the element, the activation product, and the half-life (very long half-lives will not be desirable in near-real-time applications).

1. Matrix Materials

Regarding a matrix material to be used, one property that it should possess is that that it is transparent to electromagnetic radiation having wavelengths ranging from 360 to 1000 nm, for example. With that said, there are non-scintillating and scintillating forms for a matrix. In the non-scintillating form, the constituents should be chosen such that they will generate high-energy beta/gamma radiation that will, in turn, produce Cherenkov light. A non-scintillating matrix provides the advantage of minimizing the response of the detector 100 to external gamma radiation. Examples of possible non-scintillating matrices are crystal and ceramic compositions that are suitable for the incorporation of neutron absorbing isotopes and the generation of Cherenkov light. Also, non-scintillating glasses can be used for gamma and neutron radiation detection to take advantage of any intrinsic fluorescence and the Cherenkov light generated by photoelectrons, Compton electrons, and neutron-induced beta/gamma activity.

One example of a non-scintillating matrix is glass (not necessarily silicate glass). The majority of glasses manufactured commercially today are silicates with soda and lime, lead oxide, or boron oxide.

It is possible to also use tungstate, vanadate, titanate, molybdate, barium, strontium, phosphate, metaborate and many other glasses, such as the clear glass of zinc chloride. Glasses with high-Z components (Z value of 30 and above), such as Pb, W, Bi, Hf, Ta and Zn, are especially interesting because the presence of these elements typically increases the index of refraction of the glass (thereby lowering the minimum energy needed to produce Cherenkov light per Eq. 2) and enhances the probability of photoelectric and Compton events thereby maximizing the production of Cherenkov light.

Materials with an index of refraction between 1.5 and 1.9 with transmission bands extending as far as possible toward the deep ultraviolet, such as 100 nm, are desirable. While some of the above listed glasses are colored, many can have the color removed by the addition of appropriate reducing or oxidizing agents. One or more of such glasses have the positive attributes of strength, robustness, and chemical inertness. One or more of such glasses are likely to survive shock and heat without damage.

A particular example of non-scintillating glasses is phosphate glass systems based on variations of base lead phosphate compositions. Such glasses are extremely chemically compatible with relatively high concentration levels of a wide range of additive elements. Such phosphate glass systems exhibit a high degree of long-term chemical stability in relatively hostile aqueous chemical environments, as well as good mechanical properties, ease and economy of fabrication, and radiation damage resistance. Many elemental additives do not result in any coloration of lead phosphate glasses, and it is possible to synthesize high-optical-quality colorless lead phosphate glasses that still retain a high level of chemical durability while containing relatively high concentrations of some additives (e.g., indium, dysprosium or scandium).

Silicate-based glasses are also of interest for this application, and their coloration behavior when other components are added is generally similar to that of phosphate glasses. From the technological and commercial points of view, silicates represent the most important family of oxide glasses, and accordingly, they have been extensively investigated and characterized. In particular, the properties of alkali silicate (e.g., sodium silicate) glasses are well known, and a variety of compositions are used in containers, lamp enclosures, and as plate glass. These compositions generally incorporate Na2O or K2O and alkaline earth oxides (MgO, CaO, or BaO), as well as low concentrations of Al2O3. Fused silica is another possible matrix material.

It is preferred that the glasses described previously to be used as a matrix are clear in order to enable easy detection of Cherenkov light in the blue/ultraviolet spectrum. To see how the use of a clear glass as the matrix for neutron activation materials 110 enables the use of materials and reactions whose cross sections are too low for general use, consider arsenic. Arsenic is activated with a 4-barn cross section by thermal neutrons. The mean free path of thermal neutrons in elemental arsenic of full density is approximately 5 cm, meaning that a piece 5 cm thick will absorb 63% of the incident thermal neutrons. Activated arsenic emits 3 MeV (endpoint energy) beta particles, implying that any sample more than about 2 mm thick will have a significant self-absorption correction. But, when incorporated in a clear glass (it happens that many arsenates are stable compounds and form clear glasses and crystals), blocks containing over 10 times as much arsenic as the 2 mm thick piece can be used because the Cherenkov light from each beta particle is collected.

Besides glasses, it is also possible to use an optically clear plastic or crystal for the matrix. Possible clear plastics are polyvinyltoluene, polystyrene, and polymethylmethacrylate. One disadvantage in using plastic is that plastic has a density that is 3-5 times lower than that of glass. This implies that glass panels (especially if Pb or other high-Z components are used) having the same interaction probability as a plastic scintillator for higher-energy photons will be realized in panels commensurately thinner.

Other possible matrix materials that can be used are various composite and crystalline materials. Also, gels, semiconductors, conductors, insulators, amorphous solids, composites and plastics can be used. Furthermore, the matrix can be a liquid, such as water, hydrocarbon solvents, oils, or alcohols, wherein the liquid is encapsulated in a clear container made of fused quartz, or clear plastic, for example.

In each of the above-described non-scintillating matrix materials described there are no photoluminescent materials, such as phosphor materials, present in the matrix. In alternative embodiments of the above described non-scintillating matrix materials, photoluminescent materials are present.

While the above examples regard non-scintillating matrix materials, it is also possible to disperse scintillating materials in the matrix materials described above. Such scintillating materials would interact with gamma rays, electrons, positrons, and reaction products and result in the production of scintillation light that can be detected by detector 116.

2. Isotopes to be Incorporated within Matrix

The addition of activator sensitive isotopes, such as neutron-sensitive isotopes, to the above-mentioned matrices offers the possibility of using such matrices in activator detectors, such as neutron detectors. In the case of neutron-sensitive isotopes, the isotopes chosen will respond to both fast and slow neutrons; radioactive products in the glasses produced by (n, f {fissionable materials}), (n, p), (n, α), (n, γ), and other reactions will be detectable.

By developing formulations with beta/gamma active neutron-sensitive constituents, the glasses will not only detect neutrons, but will be able to distinguish the neutron signal from the gamma signal by virtue of the time response of the neutron signal. This is how the well-known activation analysis technique works.

Passive activation analysis employs foils and other physically small samples because it is necessary to balance the need for efficient interaction with neutrons and the need for the signature of the activation to escape to be detected. Beta and low-energy gamma radiation suffer from high absorption in solid materials (for example, a 1 MeV electron has a range less than 1 mm in indium metal, a common activation foil material) and so a number of materials cannot easily be used because a sample sufficiently large to interact with neutrons with high probability will absorb its own radiation. The present invention improves this situation by selecting isotopes whose reactions with neutrons leads to products emitting high-energy beta particles and gamma rays, and incorporating these isotopes into non-fluorescent matrices. In the case of scintillating glasses, the activated radioactive species will generate light by the usual scintillation processes, while in the case of non-photoluminescent glasses, such as non-fluorescent glasses, light will be the result of the Cherenkov effect. This may be preferable to scintillators because it will be little affected by environmental conditions (scintillators' light production typically depends on temperature), the glass will be simpler to produce, and the physical process that transfers energy from the ionized matrix to the scintillator molecule is bypassed. By incorporating multiple absorbers, neutron spectral and dosimetric information vital to consequence management will be obtained.

The detection of gamma rays by sensing light generated by Compton electrons and photoelectrons leads to a method of detecting neutrons enabled by selecting constituents having reasonably high capture cross sections. Capture of neutrons in isotopes often results in products that are beta/gamma active. These betas and gammas will produce light whose intensity will rise (as the activation product reaches saturation) and fall (as the activation product decays) according to the half-life of the activation product (see equations 4 and 5, below). In this manner, the contribution of neutrons and gamma rays may be separated.

The selection of neutron-sensitive elements/isotopes will be guided both by the half-lives of the radioactive species and the energy of the emissions. In the discussion to follow, the matrix of choice will be a glass. A variety of neutron sensitive/Cherenkov materials can be incorporated into the glass matrix. Clearly, however, the choice and concentration of elements will be influenced by their neutron interactions. A non-exhaustive list includes rare-earth elements, Ag, Gd, Nd, In, Zn, Si, and As. Of course, the principles of using neutron-sensitive constituents in glasses can be extended to the other matrices mentioned above.

While the above examples regard the incorporation of a single type of neutron sensitive isotope in the matrix of the neutron sensitive material 110, it is possible to use multiple types of neutron sensitive isotopes in the matrix. The deployment of glasses containing a variety of neutron activation materials will enable more accurate source term reconstruction. The activation materials need not be in different glass pieces (unless there are chemical incompatibilities) since their separate activations are detectable from the decay of the time signature.

In the case of multiple types of neutron-sensitive isotopes used in the matrix, count rate information derived from such a suite of activated neutron-sensitive isotopes provides a data set from which the incident neutron spectrum can be deduced. Different activated materials decay with different characteristic times, and are sensitive to different portions of an incident neutron spectrum. By measuring the amount of Cherenkov light as a function of elapsed time, the components corresponding to the different materials can be identified and quantified. Since the activation cross sections of the stable isotopes are well known, and the amount of each material in the detector is predetermined, the incident neutron spectrum can be calculated from the ratios of the amount of each activated isotope.

Because of the chemistry of glass, the incorporation of metals (via their oxides) is relatively easy. A number of elements, such as indium, have high capture cross sections with the product isotope being beta/gamma active with energetic radiations. In the case of indium, the beta endpoint energy is 1 MeV, and the maximum gamma energy is 1294 keV. Both the beta particles and the gamma rays are sufficiently energetic to generate intrinsic scintillation and Cherenkov light, both of whose temporal signatures will decay with a half-life of 54 minutes.

In the case of a lead phosphate glass matrix, the neutron sensitive materials In and Sc can be dispersed in the matrix resulting in lead indium phosphate glass and lead scandium phosphate glass. Rare earth ions may also be dispersed in the lead phosphate glass matrix.

The glasses can be manufactured as square plates having a length of about 15 cm and a thickness of about 1 cm. Such a small size for the glasses is possible since the neutrons interact efficiently within the glasses and induced beta radiation is captured within the glasses. Of course, other shapes for the plates are possible depending on the particular application. Examples of processes to form the glass matrices are described in U.S. Pat. Nos. 4,699,889; 4,847,008; 4,847,219; 5,298,329; and 5,812,729, the entire contents of each of which are incorporated herein by reference.

Such glasses have indices of refraction near 1.8, and upon irradiation by gamma rays with energies above approximately 300 keV, the glasses will generate Cherenkov light from the photoelectric effect and Compton scattering.

3. Lead Indium Phosphate Neutron Sensitive Material

An illustrative example of a neutron sensitive material 110 is a lead phosphate glass with an Indium isotope incorporated therein. FIG. 3 shows a sample of a lead indium phosphate glass (hereinafter "PbInPO4 glass"). Pulse-height spectra obtained with an XP2020Q photomultiplier made by Photonis and a 2.5 cm diameter by 1 cm thick PbInPO4 disk are shown in FIG. 4. A "Bare Tube" spectrum is obtained from a tube covered only with aluminum foil and black vinyl tape. FIG. 4 shows the pulse-height spectrum obtained when the bare photomultiplier tube was counted in ambient background (black data points labeled "Bare Tube"), when the tube with the glass mounted on it was counted in ambient background (light data points labeled "Glass"), and when the entire assembly was exposed to a 22Na source (gray data points). The curve marked "Glass" shows that the presence of the glass enhances the photon response without changing the shape of the spectrum. There is no scintillator in this glass; the production of energetic photoelectrons and Compton electrons generates a count rate approximately 5 times over background.

As explained previously, FIG. 3 shows the threshold for Cherenkov light as a function of index of refraction. The curve for electrons is the kinetic energy (calculated relativistically) giving an electron whose speed is c/n (where c is the speed of light and n is the index of refraction). The curve for gammas, represents the energy of the gamma necessary to produce a Compton electron whose speed is c/n. For photoelectrons, the gamma threshold is obtained by adding the ionization energy to the electron curve. Thus the threshold for gammas to produce photoelectrons from the K-shell of the lead in PbInPO4 glass is approximately 192 keV, for gammas to produce Compton electrons is 223 keV, and the threshold for electrons (or positrons) is 104 keV. Consequently, a 99mTc source would be invisible to a Cherenkov detector made with this glass, while 239Pu gamma rays, 2614 keV and 1460 keV background, gamma rays, 133Ba, 137Cs, and 238U gamma rays would remain visible.

As shown in FIG. 3, as the index of refraction decreases, the threshold energy rises and a Cherenkov detector becomes less sensitive to low energy gamma rays. From this information, it is seen that indium is a good constituent for the glass because when activated its major emissions are beta particles with endpoint energies of 600, 872, 1135, and 3274 keV, conversion electrons of 134 and 162 keV, and gamma rays of 416, 818, 1097, 1293, 1507, and 2112 keV, all of which are above the thresholds for production of Cherenkov light.

The spectrum labeled "Glass+22Na" of FIG. 4 has a different shape than the background spectra. This is a consequence of the production of Cherenkov light by 511 and 1274 keV gamma rays from 22Na. Since the index of refraction of this glass is approximately 1.8, both gamma rays produce Cherenkov light (see FIG. 3, above) by liberating photoelectrons and Compton electrons, and the count rate is indicative of the source strength.

Figure 5:
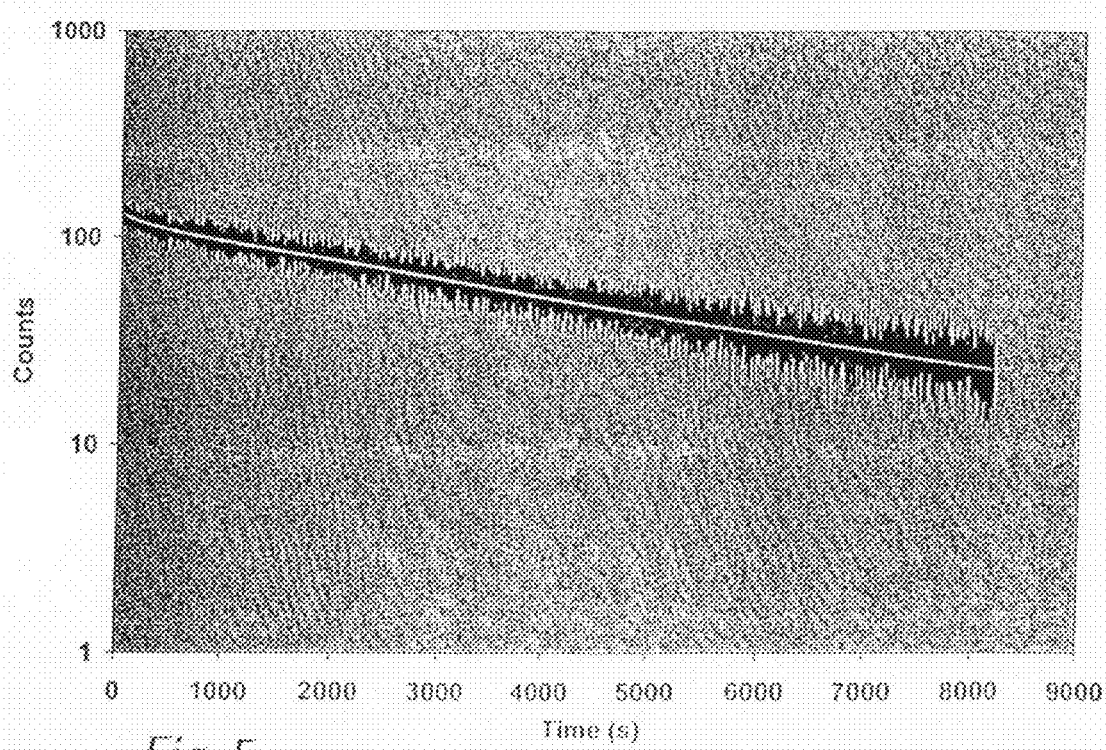
FIG. 5 shows the decay of Cherenkov light generated by the neutron activation material of FIG. 3.

FIG. 5 shows the neutron-induced radioactivity observed in the sample shown in FIG. 3. The data were fit by a constant and three exponentials, and exhibit a 2.6 minute half-life, a 51.5 minute half-life, and a half-life longer than 2 hours (that could not be determined with any accuracy). The first is probably caused by the recovery of the photocathode from its exposure to light while mounting the glass sample, and the 51.5 minute half-life demonstrates the activation of the indium in the glass. The indeterminately long half-life is possibly caused by production of 32P, but could be caused by some other impurity in the glass.

In the above examples, the neutron sensitive isotope is dispersed in a matrix. In an alternative embodiment, a neutron sensitive material 210 to be used in detector 100 includes alternating layers of matrix and isotope materials as shown in FIG. 6A. The matrix materials 120 are any of the matrix materials discussed previously. Alternating hydrogenous neutron moderating material layers 121 can also be included with the matrix material layers and the isotope material layers as shown in FIG. 6B to enhance the response of thermal-neutron sensitive materials by slowing down the impinging neutrons sufficiently so they constitute thermal neutrons. For example, the matrix material can be a clear glass where no scintillator has been added. The isotope materials 122 include foils (such as silver foils), powders, film or other materials containing neutron sensitive isotopes as identified previously. Note that instead of being multiple moderating layers, the moderator can just surround a stack of the layered matrix materials and the isotope materials. The order, thicknesses, shapes and sizes of the layers would depend on the particular application.

4. Detector

With the neutron sensitive material 110 in place at the output section 116 of the housing 102 of the neutron activation detector 100, the Cherenkov light and gamma radiation generated by the incident neutrons 106 interacting with the isotopes of the material 110 are directly detected by a light detector 118 positioned adjacent to material 110. Since Cherenkov light is mostly blue, a photomultiplier tube is the most likely choice for light detector 118. A solid-state readout device may be used as well. For glasses incorporating phosphors, the appropriate readout will depend on the emission spectrum of the phosphor. While red-enhanced photomultiplier tubes exist, photodiodes may be the more appropriate choice for redder emissions.

The light detector 118 is easily shielded from external activity. Because the primary cause of Cherenkov light is fast beta particles, the detector's housing will be sufficient to shield it from external beta particles. External gamma radiation can be shielded by lead or bismuth, which does not affect the incident neutron spectrum significantly.

FIG. 7 shows an, embodiment of a detector to be used with the system of FIG. 1. The neutron sensitive material 110 abuts an entrance window of a photomultiplier tube that is used for light detector 118. A high-voltage divider 119 provides electrical bias to the electron multiplying structure within the photomultiplier and also provides a connection to the anode of the tube. The housing 102 can be wrapped with aluminum foil and black tape in order to keep external light from entering the detector 118.

5. Data Analysis

As shown in FIG. 8, the anode of the light detector 118 is connected to a discriminator 200 via cable 202, wherein the discriminator 200 converts all pulses exceeding a voltage threshold set by the discriminator 200 into a digital pulse. The pulses are then sent to a multi-channel scaler 204 via cable 205. The multi-channel scaler 202 is connected to the computer 206 which acts as an analyzer 124 of the received digital pulses.

A typical symmetric Cherenkov light pulse is shown by the digital storage oscilloscope 208 of FIG. 8. The pulse is roughly a 1 V pulse that goes from 0 to 1 V in 5 ns, and then drops back to baseline in 5 ns. The symmetrical shape is in contrast to scintillators, which always have an exponential decay. Cherenkov light pulses occur over time frames lasting picoseconds to nanoseconds, only as long as it takes for the electron to slow down below the threshold speed (c/n).

As shown in FIG. 8, the display 126 of the computer 206 shows a time profile of the decay of the activator sensitive isotope(s) within the receptor material. An example of such a decay plotted on a logarithm scale is shown in FIG. 5. The computer 206 controls the multi-channel scaler 204 and acts as analyzer 124 in that it performs the fit to a sum of exponentials as explained hereinafter. The computer 206 could also do an analysis to estimate the activator (such as neutron) spectrum. Thus, the light detector 118 is able to identify a signal characteristic of the activator in a real time manner based on the Cherenkov light received by the light detector.

The detector 118 can send a continuous stream of data in real time to the computer 206/analyzer 124 so that the data contained in the detector signals can be stored in memory within computer 206/analyzer 124 and retrieved at a later time for analysis by analyzer 124. An RF transmitter, USB connection, RS-232 connection, or Ethernet communication can be used for sending the signals to the computer 206/ analyzer 124. The computer 206/analyzer 124 can include a pulse counter so that count-rate data (multi-channel scaler) can be generated and analyzed remotely.

The computer 206/analyzer 124 can also transmit activation data to a remote location for subsequent analysis. Transmission of the data enables remote post-irradiation analysis and appropriate selection of neutron-sensitive materials enables the generation of definitive results in hours rather than several days. For example, the level of activation will be determined by the computer 206/analyzer 124 by fitting the decay curve to a series of exponentials by decomposing the time-series data into a sum of decaying exponentials which will distinguish the activity of various isotopes in the detector from external activity. Data such as those shown in FIG. 6 point to the method to distinguish the effects of multiple activators in the same glass. Of course, it is important not to mingle species with nearly identical half-lives.

By developing formulations with beta/gamma active neutron-sensitive constituents, the glasses will not only detect neutrons, but will be able to distinguish the neutron signal from the gamma signal by virtue of the time response of the neutron signal.

6. General Principles of Invention

While the above examples of FIGS. 1-8 regard the detection of neutrons, the principles of detection can be extended to other activators such as gamma rays and charged particles (such as electrons and positrons). In particular, gamma-sensitive materials and charged-particle-sensitive materials can be developed to replace the neutron sensitive materials described previously with respect to FIGS. 1-8 and to be used with the systems of FIGS. 1 and 8. The gamma sensitive materials and charged particle sensitive materials can use the matrices previously described and have isotopes dispersed therein that capture gamma rays and charged particles, respectively, or cause the ejection of nucleons. The isotopes will then generate by-products in a manner similar to the neutron sensitive isotopes previously discussed. The Cherenkov light generated by the by-products is analyzed in a manner similar to the Cherenkov light generated by the neutrons interacting with neutron-sensitive material mentioned previously. Examples of isotopes for gamma-sensitive materials would be 39K and 19 F.

Based on the previous discussion regarding the PbInPO4 glass, certain general principles of the invention can be understood. The discussion will be directed to neutron activation, but is applicable to the gamma and charged particle activation of corresponding gamma and charged-particle-sensitive materials as mentioned previously. With the above said in mind, upon exposure to external activators that do not cause radioactivity, the Cherenkov light and intrinsic scintillation will rise and fall according to the flux. However, the components due to neutron capture will depend on the decay rate of the radioactive product and obey the relationship:

$$dn/dt = \Phi\sigma N - \lambda n,\qquad\text{Eq. (4)}$$

wherein $\Phi$ is the incident neutron flux, $\sigma$ is the parent isotope's capture cross section, N is the number of parent atoms exposed to the flux, $\lambda$ is the decay constant of the product, and n is the number of product atoms.

Assuming that there is a constant source introduced at t=0, then the solution of the above relationship for the number, n, of product atoms is given by:

$$n = \phi\sigma N(1-e^{-\lambda t})/\lambda\qquad\text{Eq. (5).}$$

Based on the above solution, the activity level, $\lambda n$, increases asymptotically, according to the decay constant of the product, to an equilibrium value. When the source is removed, the activity level and light production fall according to the usual radioactive decay law. For a time-varying source introduced at t=0, the solution is the convolution of the exponential response of the radioactive species, and the source function. Detection of the time signature having the characteristic time constant $\lambda$ is indicative of the presence of neutrons.

Since there is a threshold for the production of Cherenkov light prescribed by the physics of the process, by adjusting the index of refraction of the neutron activation material 110, a gamma detector based on this effect can be "tuned" to have a Cherenkov response only to gamma radiation above a specified energy. When the intrinsic scintillation of the glass can be minimized, such detectors are made blind to most medical isotopes (99 mTc, for example emits at 140 keV), while still being sensitive to the higher-energy emissions of other materials. Note that the neutron response of the proposed detectors is separable from the gamma response by detecting the time dependence of the buildup or decay of light.

Robust detection and verification of shielded special nuclear materials is also possible with the neutron activation detector 100. For example, non-scintillating glass-based detectors are denser, and less sensitive to the elements than scintillators and provide simultaneous sensitivity to neutrons and gamma rays combined with the ability to distinguish the responses. While the proposed devices probably will not distinguish 252Cf from a Pu or an AmBe source, it will distinguish such neutron sources from medical isotopes. In addition, a glass formulation that minimizes the intrinsic scintillation response, will distinguish most medical isotopes from nuclear materials based on the Cherenkov response.

Although, the common wisdom among vendors of detection equipment is that more sensitivity is always better, this may not always be true because intense, low-energy nuisance sources (such as medical isotopes) generate nuisance alarms and may, therefore, mask the presence of sources of interest. A better mantra would be that increased targeted sensitivity is always better because while plastic scintillators are quite efficient when sufficiently thick (mean free path of 1-3 MeV photons is approximately 15 cm, necessitating paddles approximately 10 cm thick to achieve 50% efficiency), they can be too efficient at the low energies characteristic of medical isotopes, and can be blinded by the presence of nearby strong source. The use of a Cherenkov detector can eliminate this difficulty because the index of refraction can be made sufficiently low that there would be no response to most medical isotopes.

A further advantage of exploiting the Cherenkov effect is that the response will not be a strong function of temperature because the underlying physical process does not depend on chemical reactions or electronic transitions of activator ions or centers.

7. Alternative Detection Schemes a. Photoluminescent Detector

The previous described detection schemes involved the detection of Cherenkov light and using its presence to infer that activators, such as neutrons, gamma rays or charged particles have impinged on a detector. Such Cherenkov light is generated by having the activators initiate a nuclear reaction that releases by-products that cause Cherenkov light to be generated. In an alternative detection scheme, a photoluminescent detector is used wherein the released by-products discussed above can be made to activate a photoluminescent material, such as a phosphor, causing the photoluminescent material to generate light. The released by-products can also be generated by nuclear reactions that do not involve a radioactive decay. Such light generated by the photoluminescent material can be detected by the light detector 110. Furthermore, such a photoluminescent material would be dispersed in the receptor materials discussed previously.

As an example of such a photoluminescence detector to be used with the system 100 of FIG. 1, a photoluminescent material, such as Nd, Pr, Ho or Er, is dispersed in a neutron sensitive material, such as lead phosphate glass. Concentrations of 1-3% of the photoluminescent material can be used. In such a neutron sensitive material 110, infrared fluorescence of Nd in lead scandium phosphate glass (hereinafter "PbScPO4 glass") occurs when the glass is irradiated with both visible light and long-wavelength UV. An example of absorption and emission spectra when Nd is used is shown in FIG. 9.

The addition of either Nd, Pr, Ho or Er to lead scandium phosphate glass produces a phosphor when activated by the by-products resulting from the activation of the scandium. The phosphor emits at infrared (IR) wavelengths when illuminated with visible light. Since Cherenkov light is primarily visible, it too will fluoresce the Nd, Pr, Ho or Er and result in an IR signature that will decay with the same half-life as the neutron activation product.

The left curve of FIG. 9 is the relative intensity of 1056 nm light as the incident wavelength is scanned from 300 to 800 nm. The right curve of FIG. 9 is the emission spectrum observed when the sample is illuminated with 583 nm light. What is apparent here is that the main IR peak is stimulated even when blue light is used (355 nm). Since Cherenkov light is blue to ultraviolet, IR should be emitted in response to stimulation by either of these light sources. This last point can be significant because the transmission characteristics of the glass show that in the visible region, even 1 cm of glass has significant absorption. However, at wavelengths above 800 nm, a higher percentage of IR light generated within the glass will be able to reach the surface. This would allow for the use of diodes to detect the IR light. Consequently, use of Nd, Pr, Ho or Er-doped glass may eliminate the need for photomultiplier readout.

Besides PbScPO4 glass, other glasses can also be used to incorporate Nd, such as PbInPO4 glass. Indeed, it is envisioned that the neutron activator materials mentioned previously can be adapted to have Nd, Pr, Ho or Er dispersed therein so as to operate in the manner mentioned above. Furthermore, it is envisioned that the photoluminescent detector can be used with the detector components/systems shown in FIGS. 1, 6A-B, 7, 8 and 10.

b. Neutron Absorption Detector

In an alternative detection scheme, an activator absorption detector, such as a neutron absorption detector, is used wherein a receptor material that lacks a photoluminescent material is used. The solid matrix materials discussed previously can be used, such as glasses (lead phosphate glass as an example), plastics, ceramics, for example, to form a solid receptor material. Matrix materials can include fluids that are either a fluid that is predominately water (such as water alone) or a fluid that predominately lacks water. In the case of fluids predominately lacking water, oils, hydrocarbon fluids and silicone fluids, for example, could be used. Activator absorbing materials, such as neutron absorbing materials, are dispersed in the matrix, wherein the activator absorbing material absorbs the incoming activators so as to form a stable isotope that emits ionizing electromagnetic radiation that energizes particles, such as electrons or positrons. The energized particles then generate Cherenkov light. Since the matrix is sufficiently transparent to blue/UV light, the light can be detected by light detector 110 of detector 101.

For the purpose of the discussion of this detector, a stable isotope is either an isotope that experiences no radioactive decay or is radioactive with a half-life that is much longer than the desired exposure time for a particular application of the detector. In particular, a detector used for a portal monitor such as described hereinafter with respect to FIG. 10 can have radioactive isotopes formed with half-lives of several days since the exposure time is short when using a portal monitor. In such a situation, the number, n, of product atoms is approximately $n=\phi\sigma Nt$ per equation (5). In the case of neutron activators, suitable neutron absorbing materials include isotopes of indium, scandium, Gd, W, Ag, Hg, Ir, Yb, Fe and rare earth elements.

In the case of Gd, many complexes are envisioned that could be used to disperse Gd in the matrix. For example, GdCl3, crystals of GdCl3(CH3OH)4 and Gd nitrate tributylphosphate complex dissolved in hydrocarbons are possibilities.

The above described detector can be placed in a layered structure similar to that described in FIGS. 6A-B. For example, layered configurations of either 1) plain glass, absorber, plain glass, . . . , or 2) moderator, absorber, plain glass, absorber, moderator . . . are possible. Furthermore, the moderator can just surround a stack of glass, absorber, glass, In the embodiments discussed above, the absorbing material lacked a photoluminescent material. It is envisioned that an infra-red photoluminescent material could be dispersed in the matrices described above. In this case, the activator absorbing material would generate Cherenkov light as described above, wherein such light would activate the infrared photoluminescent material resulting in infra-red light being generated which in turn can be detected by a detector, such as diodes, so that an infra-red signature of the activator is generated.

8. Applications for Invention

In the discussion to follow, a number of applications for the neutron sensitive detector 101 and system 100 are discussed. Obviously, the gamma and charged-particle-sensitive detectors and systems, photoluminescence detectors and systems and neutron absorption detectors and systems previously discussed can be used in the same applications in a similar manner.

a. Portal Monitoring

Figure 10:
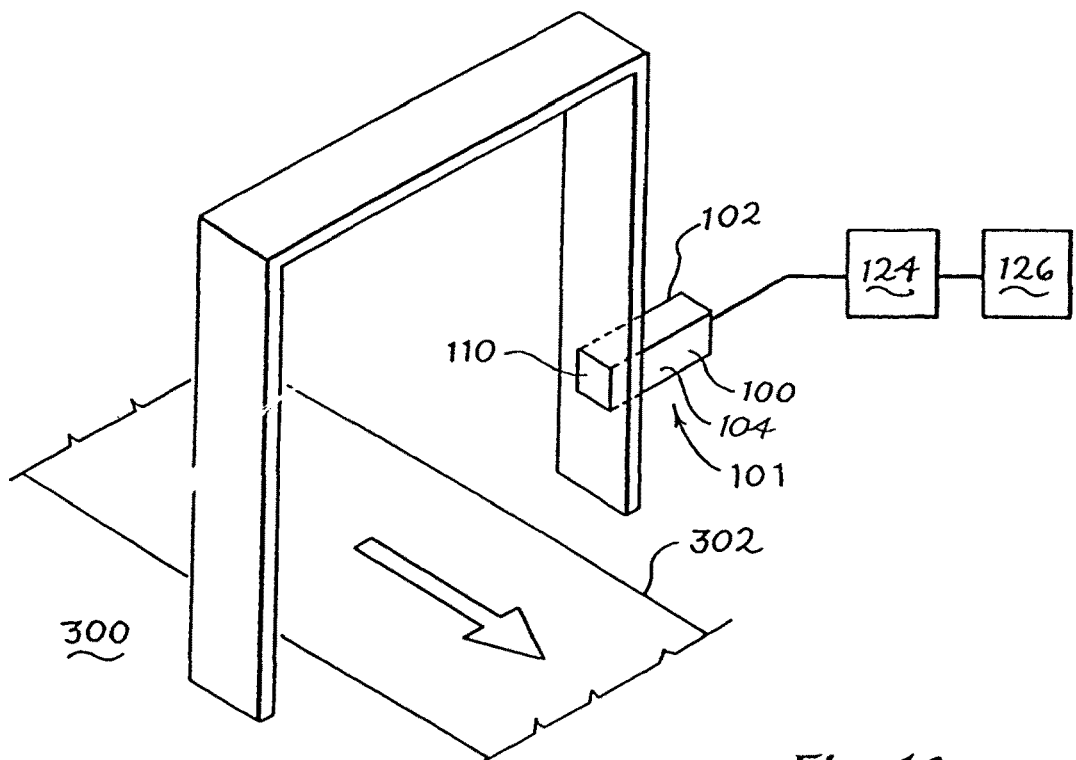
FIG. 10 schematically shows a radiation portal monitor that uses the neutron activation detector elements of FIG. 1 and FIG. 7.

Glass Cherenkov detectors will have use in portal monitors to be deployed in high-traffic pedestrian areas (where medical isotopes are not uncommon) or in areas where medical isotopes are stored (such when staged at airports prior to shipment). As schematically shown in FIG. 10, a portal monitor 300 can define an entryway through which a person walks or an object passes through (via a conveyor belt 302, for example). The portal monitor 300 includes at least one neutron-sensitive detector 101. In operation, the time evolution of the response of the neutron-sensitive material 110 is measured based on the fact that the neutron sensitive isotopes in the matrix have a known half-life. The measured response is used to detect the change in neutron flux, even in the presence of gamma background radiation. In particular, a gamma source passing through the portal monitor 300 will produce an instantaneous change in the count rate detected by analyzer 126 in FIG. 1. The neutron source will cause a rise with a rate characteristic of the neutron-sensitive material 110 as discussed previously in order to provide discrimination between neutrons and gamma rays. If the amount of neutrons detected rises to a certain level, then a visual or audible alarm can be set off to alert an inspector at the scene.

b. Cargo Monitoring

Neutron-sensitive detectors 100 are expected to be useful for the long-term monitoring of the presence of radioactivity in cargo in transit—including radioactive material in sea-land containers, rail cars, trucks, and aircraft. By selecting neutron sensitive isotopes to be dispersed in the matrix of the neutron-sensitive material 110 to have half-lives appropriate to the time of travel and application, neutron detectors tailored to the transit time of cargo can be produced. For example, a transoceanic air crossing is completed in 10-20 hours and would use neutron sensitive isotopes having half-lives of 3-7 hours. For maritime crossings, the half-lives can be 12-30 hours. Such half-lives allow the activity of the isotopes to saturate well in advance of arrival in the United States. Use of multiple sensitive species with different half-lives will provide increased certainty of the measurement since each sensitive isotope serves as a witness for the others.

Besides being used for long-term monitoring, detector 100 can be used for detection of neutron sources in near-real-time situations. In such a scenario, detector 100 will use isotopes with shorter half-lives (such as Ag or Al). Such short half-life materials can be activated and read out by noting the time profile of rise in count rate when the neutron source is present and the fall in the count rate when the neutron source is absent.

c. Dosimetry

A third application of this technology is in both fast and slow neutron dosimetry and source reconstruction. Since the proposed work will lead to glasses in which the neutron-sensitive component is in an intimate mixture within the matrix, reaction products from $(n, \gamma)$, $(n, p)$, $(n, \alpha)$, and other reactions become detectable without the need for self-absorption corrections, even when the glass detector is relatively large. The ability to make useful detectors larger than what might ordinarily be practical for activation analysis opens the door to the use of elements whose cross sections are too small for use in activation foils.

By appropriate selection of neutron-sensitive isotopes with sufficiently long half-lives and appropriate cross sections, it will be possible to reconstruct the incident spectrum and dose at a particular point in time. For example, pre-deploying a set of detectors 100 (with different neutron-sensitive materials 110) around a nuclear reactor or LINAC will allow the reconstruction of the neutron field at the time of any accident that might occur. Such detectors 100 may be powered off until an accident occurs. Should an accident occur, witness detectors will detect the event and turn on detectors 100 before being shut down by the radiation caused by the accident. Thus, detectors 100 have the further advantages of not being blinded by external radiation and, unlike activation foils, not requiring retrieval from a radiation field to be interrogated.

d. Spectroscopy—Multiple-Detector Variation

The observations above suggest that a series of Cherenkov detectors (clearly not all can be lead phosphate) can be constructed with different physical thresholds to form a composite detector from which the flux in broad energy bins can be calculated. While this will not provide precise spectroscopic information, it is possible that discrimination between sources may be effected. In theory, the incident neutron spectrum can be determined from estimates of the induced activity of each isotope species used in the detectors. The activity of each species is deduced from an analysis of a fit of a sum of exponentials to the time profile of the decay of the activity of the neutron sensitive material 110.

The foregoing description is provided to illustrate the invention, and is not to be construed as a limitation. Numerous additions, substitutions and other changes can be made to the invention without departing from its scope as set forth in the appended claims.

We claim:

1. A detector comprising:
   a receptor material that is not predominately water and lacks a photoluminescent material, wherein upon being impinged by an activator said receptor causes light via the Cherenkov effect to be generated, wherein said activator is selected from the group consisting of neutrons and ionizing electromagnetic radiation and wherein said receptor material is a substance selected from the group consisting of a glass with an activator absorbing material dispersed therein, a ceramic, a composite, a gel, semiconductor, conductor, insulator, an amorphous solid, and a liquid that does not contain water; and
   a light detector that receives said light directly and identifies a signal characteristic of said activator in a real time manner based on said light directly received by said light detector.

2. The detector of claim 1, wherein said activator is a neutron and said receptor material is a neutron absorbing material.

3. The detector of claim 1, wherein said liquid is selected from the group consisting of an oil, a hydrocarbon fluid, and a silicone fluid.

4. The detector of claim 1, wherein said receptor material comprises said glass with said activator absorbing material dispersed therein, wherein said activator absorbing material absorbs said activator so as to form a stable isotope that either directly or indirectly emits ionizing electromagnetic radiation that energizes particles so that said particles emit Cherenkov light.

5. The detector of claim 4, wherein said glass is optically clear.

6. The detector of claim 4, wherein said glass comprises a lead phosphate composition.

7. The detector of claim 4, wherein said activator absorbing material is selected from the group consisting of indium, scandium, Gd, W, Ag, Hg, Ir, Yb, Fe, and rare earth elements.

8. The detector of claim 4, wherein said particles are electrons.

9. The detector of claim 4, wherein said particles are positrons.

10. The detector of claim 4, wherein said stable isotope experiences no radioactive decay.

11. The detector of claim 4, wherein said stable isotope is radioactive with a half-life that is much longer than a desired exposure time for said light detector for a particular application of said light detector.

12. The detector of claim 1, wherein said receptor material comprises alternating layers of matrix materials and activator-absorbing materials.

13. The detector of claim 1, wherein said receptor material comprises alternating layers of matrix materials, moderator materials, and activator-absorbing materials.

14. The detector of claim 1, wherein said receptor material comprises alternating layers of matrix materials and moderator materials.

15. A portal monitor comprising:
    a frame defining a path;
    a detector incorporated into said frame, said detector comprising:
    a receptor material that is not predominately water and lacks a photoluminescent material, wherein upon being impinged by an activator said receptor causes light via the Cherenkov effect to be generated, wherein said activator is selected from the group consisting of neutrons and ionizing electromagnetic radiation and wherein said receptor material is a substance selected from the group consisting of a glass with an activator-absorbing material dispersed therein, a ceramic, a composite, a gel, semiconductor, conductor, insulator, an amorphous solid, and a liquid that does not contain water; and a light detector that receives said light directly and identifies a signal characteristic of said activator in a real time manner based on said light directly received by said light detector.

16. The portal monitor of claim 15, further comprising a conveyor that moves along said path.

17. The portal monitor of claim 15, wherein said activator is a neutron and said receptor material is a neutron absorbing material.

18. The portal monitor of claim 15, wherein said liquid is selected from the group consisting of an oil, a hydrocarbon fluid, and a silicone fluid.

19. The portal monitor of claim 15, wherein said receptor material comprises said glass with said activator-absorbing material dispersed therein, wherein said activator-absorbing material absorbs said activator so as to form a stable isotope that either directly or indirectly emits ionizing electromagnetic radiation that energizes particles so that said particles emit Cherenkov light.

20. The portal monitor of claim 19, wherein said stable isotope experiences no radioactive decay.

21. The portal monitor of claim 19, wherein said stable isotope is radioactive with a half-life that is much longer than a desired exposure time for said light detector for a particular application of said light detector.

22. The portal monitor of claim 19, wherein said glass is optically clear.

23. The portal monitor of claim 19, wherein said glass comprises a lead phosphate composition.

24. The portal monitor of claim 19, wherein said activator-absorbing material is selected from the group consisting of indium, scandium, Gd, W, Ag, Hg, Ir, Yb, Fe, and rare earth elements.

25. The portal monitor of claim 15, wherein said particles are electrons.

26. The portal monitor of claim 15, wherein said particles are positrons.

27. The portal monitor of claim 15, wherein said receptor material comprises alternating layers of matrix materials and activator-absorbing materials.

28. The portal monitor of claim 15, wherein said receptor material comprises alternating layers of matrix materials, moderator materials, and activator-absorbing materials.

29. The portal monitor of claim 15, wherein said receptor material comprises alternating layers of matrix materials and moderator materials.

30. A method of detecting an activator, the method comprising:

impinging a receptor material that is not predominately water and lacks a photoluminescent material with an activator, wherein said activator is selected from the group consisting of neutrons and ionizing electromagnetic radiation and wherein said receptor material is a substance selected from the group consisting of a glass with an activator-absorbing material dispersed therein, a ceramic, a composite, a gel, semiconductor, conductor, insulator, an amorphous solid, and a liquid that does not contain water;

generating Cherenkov effect light due to said activator impinging said receptor material; and identifying a characteristic of said activator based directly on said light in a real time manner.

31. The method of claim 30, wherein said activator is a neutron and said receptor material is a neutron-absorbing material.

32. The method of claim 30, wherein said liquid is selected from the group consisting of an oil, a hydrocarbon fluid, and a silicone fluid.

33. The method of claim 30, wherein said receptor material comprises said glass with said activator-absorbing material dispersed therein, wherein said activator-absorbing material absorbs said activator so as to form a stable isotope that either directly or indirectly emits ionizing electromagnetic radiation that energizes particles so that said particles emit said Cherenkov effect light.

34. The method of claim 33, wherein said glass is optically clear.

35. The method of claim 33, wherein said particles are electrons.

36. The method of claim 33, wherein said particles are positrons.

37. The method of claim 30, wherein said stable isotope experiences no radioactive decay.

38. The method of claim 30, wherein said stable isotope is radioactive with a half-life that is much longer than a desired exposure time for said light detector for a particular application of said light detector.

39. The method of claim 30, wherein said receptor material comprises alternating layers of matrix materials and activator-absorbing materials.

40. The method of claim 30, wherein said receptor material comprises alternating layers of matrix materials, moderator materials, and activator-absorbing materials.

41. The method of claim 30, wherein said receptor material comprises alternating layers of matrix materials and moderator materials.

* * * * *